United States Patent [19]

Schmidt

[11] 4,260,896
[45] Apr. 7, 1981

[54] X-RAY UNIT

[75] Inventor: Gunter Schmidt, Malibu, Calif.

[73] Assignee: E. I. Du Pont de Nemours & Co., Wilmington, Del.

[21] Appl. No.: 925,554

[22] Filed: Jul. 17, 1978

Related U.S. Application Data

[63] Continuation-in-part of Ser. No. 805,815, Jun. 13, 1977, abandoned.

[51] Int. Cl.³ .............................................. G03B 41/16
[52] U.S. Cl. ..................................... 250/468; 250/470
[58] Field of Search ......................... 250/468, 470, 480

[56] References Cited

U.S. PATENT DOCUMENTS

| | | | |
|---|---|---|---|
| 3,233,101 | 2/1966 | Forsyth | 250/480 |
| 3,755,673 | 8/1973 | Bauer | 250/480 |
| 3,965,361 | 6/1976 | Reser | 250/468 |
| 4,019,061 | 4/1977 | Finkenzeller | 250/468 |

FOREIGN PATENT DOCUMENTS

| | | |
|---|---|---|
| 2123208 | 11/1972 | Fed. Rep. of Germany . |
| 617604 | 11/1974 | United Kingdom . |
| 1362772 | 8/1974 | United Kingdom . |
| 1373092 | 11/1974 | United Kingdom . |

Primary Examiner—Craig E. Church

[57] ABSTRACT

Apparatus for use in taking chest or other X-rays, including a dispenser for the dispensing of one film sheet at a time and a film holder which receives the film sheet and holds it tightly between intensifier screens and which then releases the film sheet for developing. The film sheet and intensifier screens are sandwiched between a backing plate and a plastic sheet. An elongated vertical pressing device can be moved against the middle of the backing plate to deflect it into a curve and thereby cause the film sheet to be held tightly against the intensifier screens.

5 Claims, 19 Drawing Figures

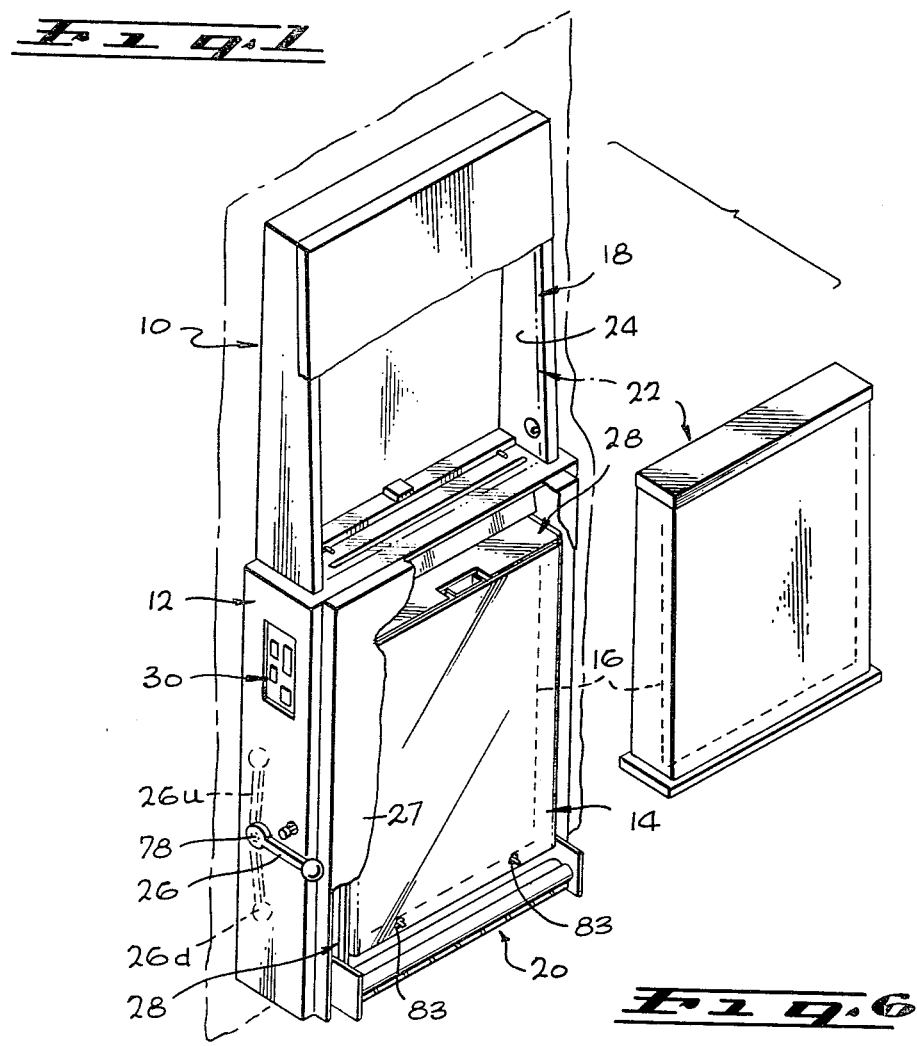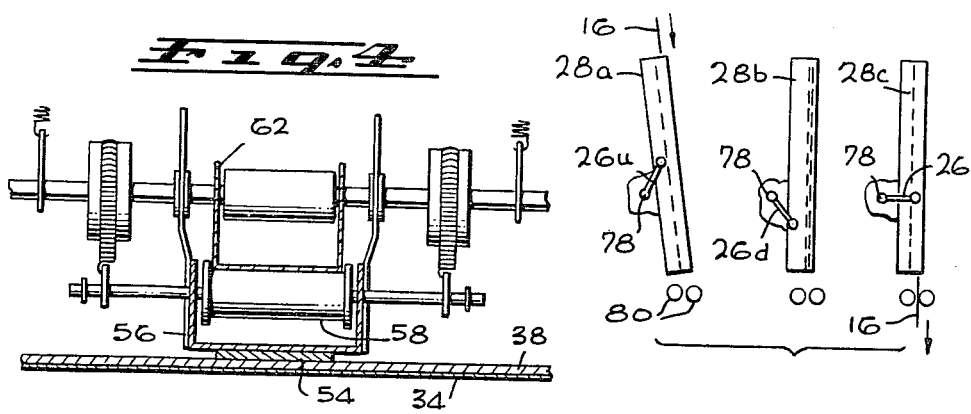

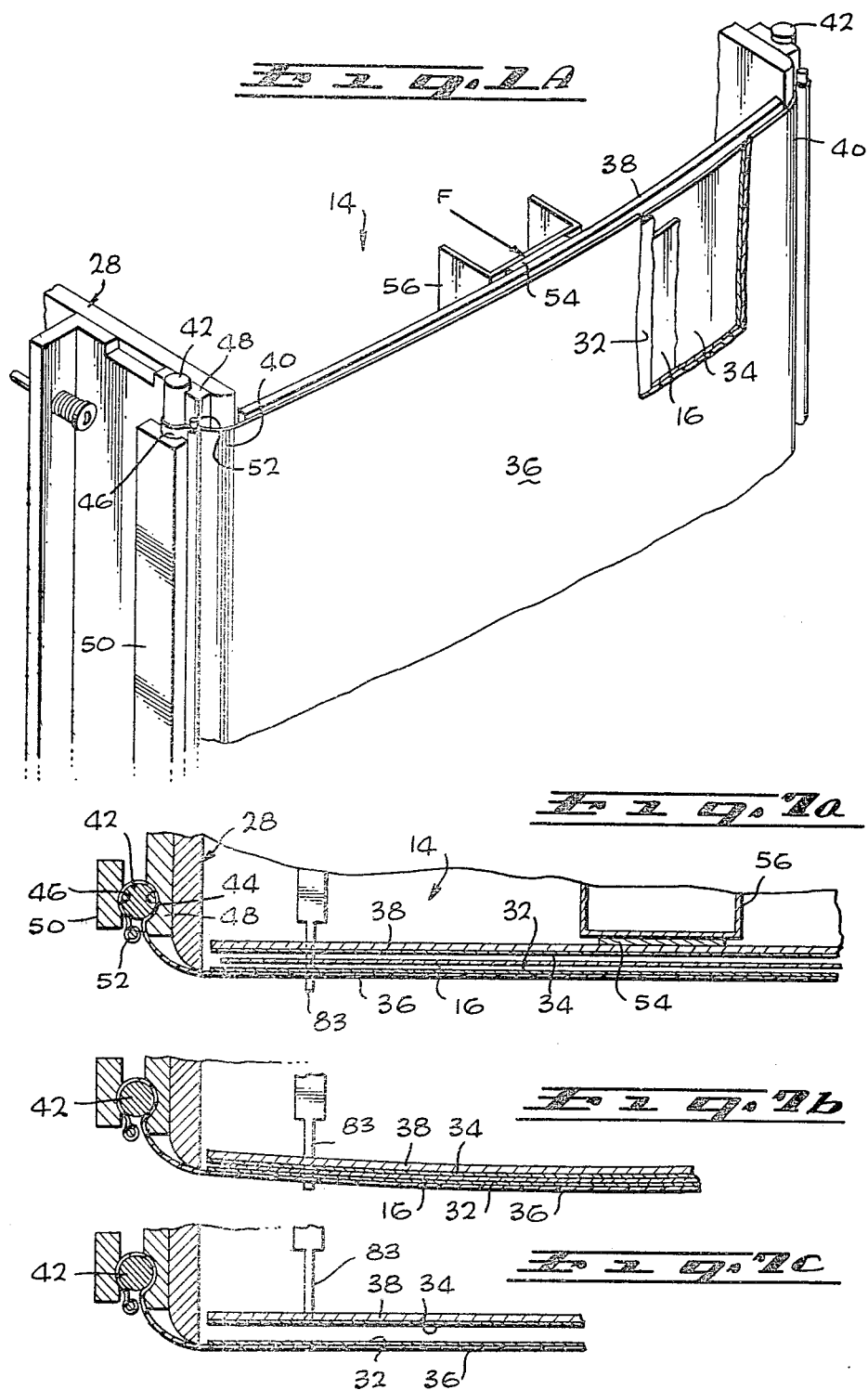

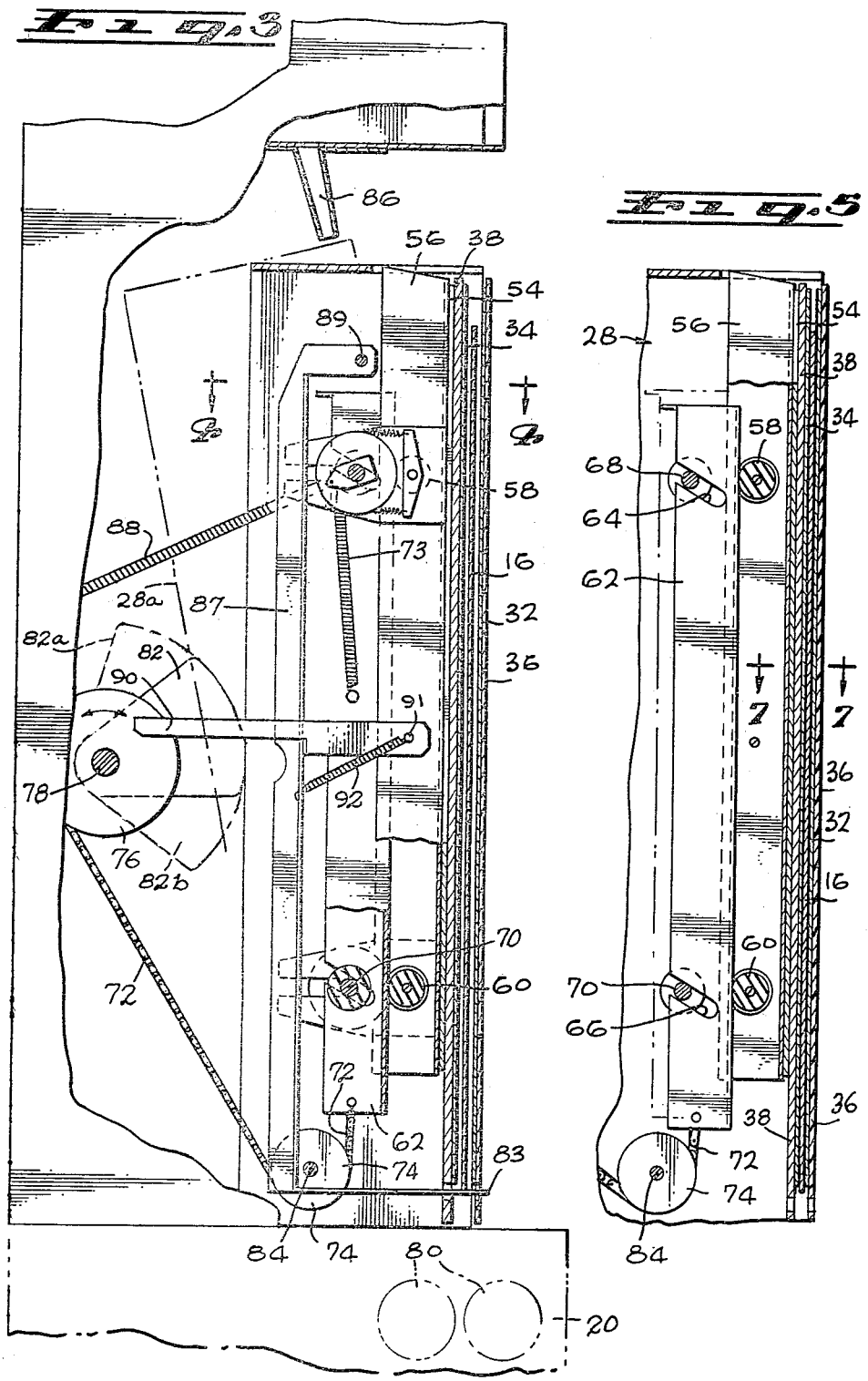

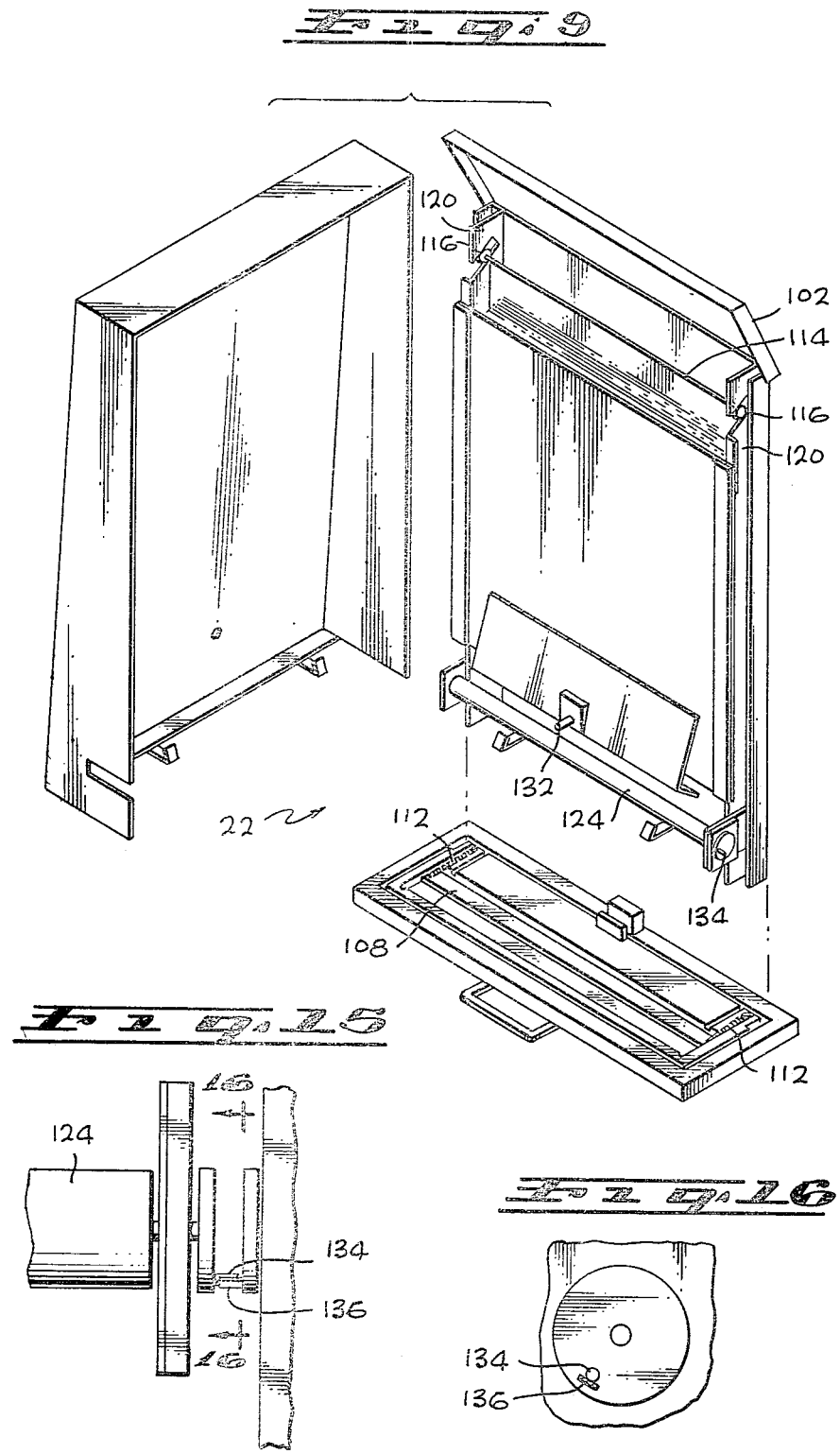

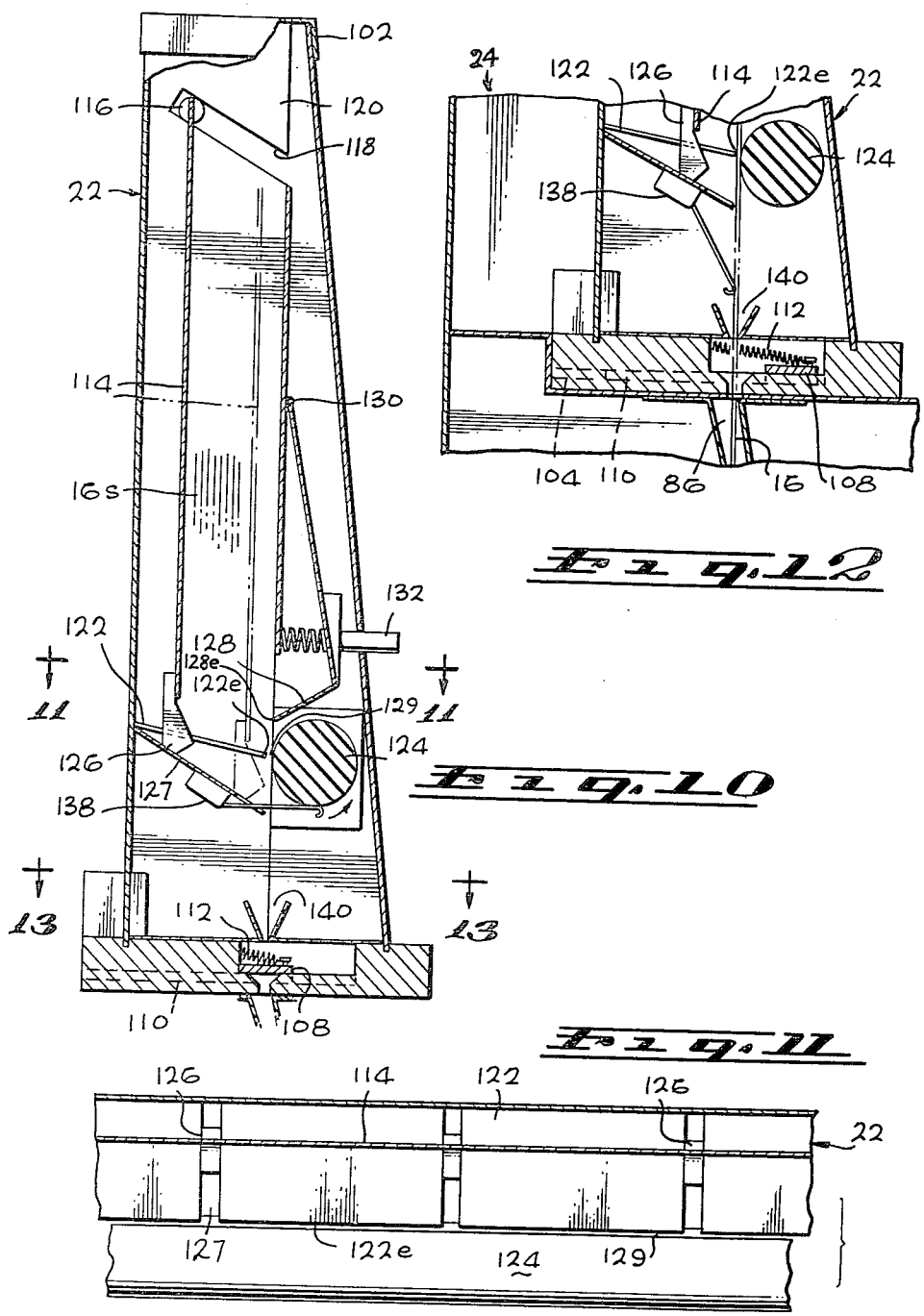

X-RAY UNIT

CROSS-REFERENCE

This is a continuation-in-part of my copending application Ser. No. 805,815, filed June 13, 1977 now abandoned.

TECHNICAL FIELD

This invention relates, generally, to the exposure of X-ray film and, more particularly, to the handling of such film in a daylight environment.

BACKGROUND

The image of an X-ray film can be enhanced by the use of intensifier screens lying intimately against opposite faces of the film. This could be accomplished by the use of metal plates at opposite faces of the film-screen sandwich, except that a metal plate in front of the film will block X-rays. It would be desirable to provide a simple and low cost device which could hold the film and screens tightly together in a unit during exposure and yet be opened to enable the dispensing of one film sheet at a time into a space between the screens and the subsequent release of the film sheet therefrom after exposure.

DISCLOSURE OF INVENTION

In accordance with one embodiment of the present invention, an X-ray unit of relatively simple design is provided, which can hold a film in intimate contact with intensifier screens, and which enables the insertion of a film between the screens and the removal therefrom in a simple manner. The apparatus for holding the film against the intensifier screens includes a resilient backing plate behind the film-screen sandwich and a flexible thin sheet lying in front of the film-screen sandwich, with the opposite sides of the flexible sheet fastened to a mounting frame. With the opposite sides of the flexible sheet held to the mounting frame, a vertical pressing member is moved against the middle of the backing plate to bend it forward and push the film-screen sandwich into a curve that holds the film and screens in intimate contact. When the pressing member is moved back, a film sheet can be fed between the intensifier screens or an exposed film sheet can be allowed to drop out from between the screens by withdrawing supporting pins that would otherwise support the film.

DESCRIPTION OF DRAWINGS

FIG. 1 is a partial perspective view of a chest X-ray unit constructed in accordance with the present invention, shown with a portion of the lighttight housing cut away;

FIG. 1A is a perspective view of a portion of the unit of FIG. 1, showing the manner of construction of the exposure portion thereof;

FIG. 3 is a view taken on the line 3—3 of FIG. 2;

FIG. 4 is a view taken on the line 4—4 of FIG. 3;

FIG. 5 is a partial view of the apparatus of FIG. 3, showing the manner in which the pressing member operates;

FIG. 6 illustrates three stages in the operation of the unit of FIG. 1;

FIGS. 7a–7c illustrate views taken on the line 7—7 of FIG. 5, the three views showing the unit at different stages of its operation;

FIG. 9 is an exploded perspective view of the film magazine of FIG. 8;

FIG. 10 is a view taken on the line 10—10 of FIG. 8;

FIG. 11 is a view taken on the line 11—11 of FIG. 10;

FIG. 12 is a partial view of the dispenser portion of FIG. 10, showing it in a condition wherein a film is almost completely dispensed from the apparatus;

FIG. 15 is a view taken on the line 15—15 of FIG. 8;

FIG. 16 is a view taken on the line 16—16 of FIG. 15.

DESCRIPTION OF APPARATUS

Figure 2:
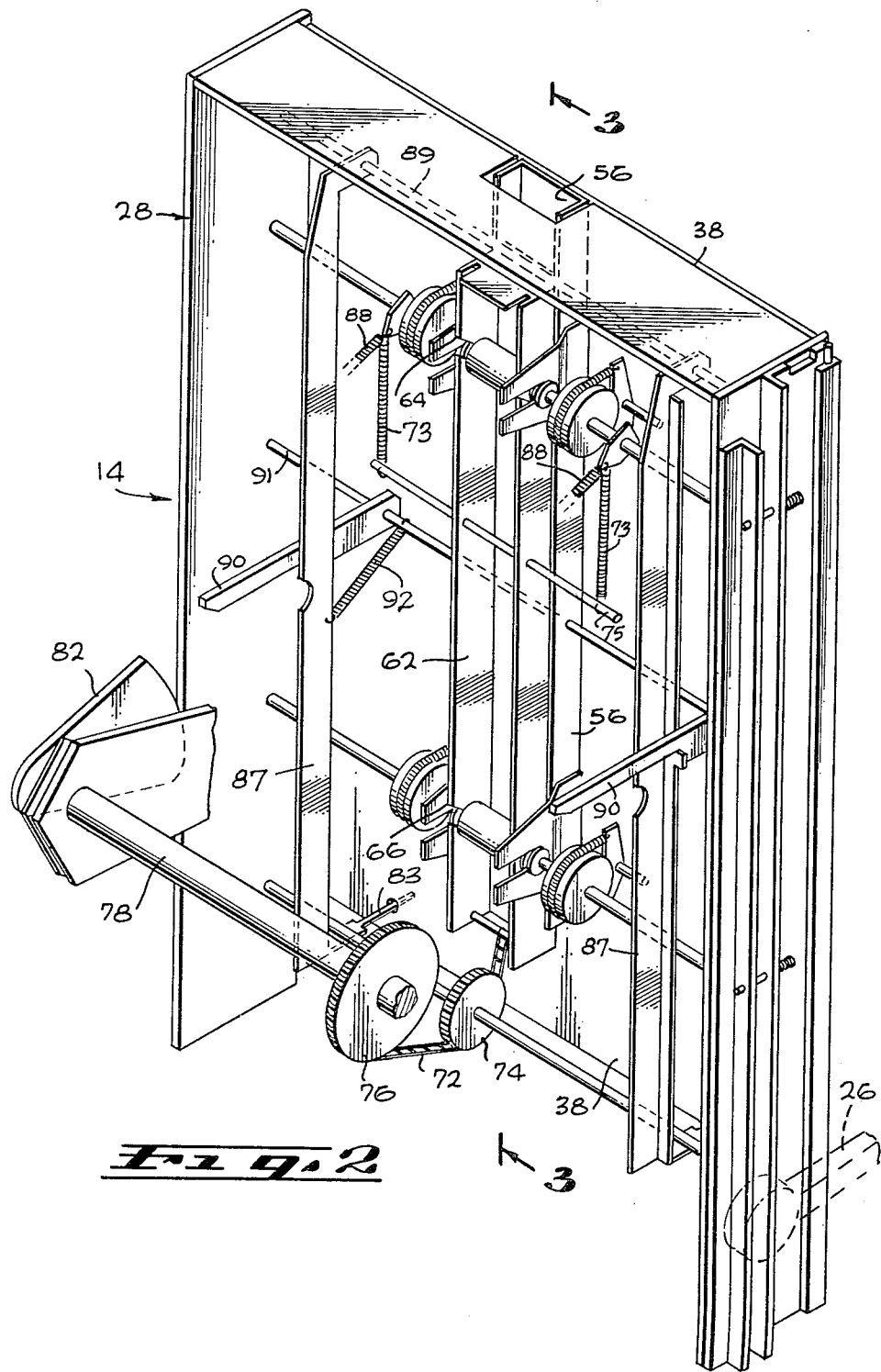
FIG. 2 is a partial rear perspective view of the unit of FIG. 1, showing the mechanism thereof.

FIG. 1 illustrates a chest X-ray unit 10 which includes a main frame 12, an exposure apparatus 14 mounted along the frame for holding a sheet of film 16, a dispenser 18 above the exposure apparatus for dispensing the film into the exposure apparatus, and an exposed film receiver 20 located below the exposure apparatus for receiving the exposed film. The unit is prepared for operation by first loading a bulk film magazine 22 into a magazine-holding portion 24 of the dispenser. Then, a handle 26 on the main frame is pivoted to an upward position 26u to tip back a mounting frame 28 of the exposure apparatus 14 to a position for receiving a film from the dispenser, and a control on panel 30 is operated to cause the dispensing of a film into the exposure apparatus. After the film has been received, the handle 26 is moved into a downward position 26d which causes the film 16 to be held in the exposure apparatus closely against the intensifier screens. A patient then can be positioned in front of a cover 27 on the exposure apparatus 14 and an exposure made. Finally, the handle is moved up to its central position 26 and the film 16 drops down into the receiver 20.

FIG. 7a illustrates the arrangement of elements adjacent to film 16 in the exposure station 14. The film 16 is sandwiched between a pair of intensifier screens 32, 34, and the screen and film sandwich is, in turn, sandwiched between a flexible front sheet 36 and a resilient backing plate 38. The screens can be permanently attached to the flexible sheet and plate, respectively. In order to obtain a uniformly full exposure of the film 16 using a minimal level of X-rays, the intensifier screens 32, 34 must be held facewise against the film at all areas of the film. This must be accomplished without using a metal plate or other similar member in front of the film that could absorb a significant portion of X-rays.

FIG. 1A illustrates the basic manner in which the film 16 is held tightly to all areas of the intensifier screens 32, 34. The backing plate 38 is constructed of a flexibly resilient material such as an 0.1 inch (2.54 mm) thick magnesium plate. The front sheet 36 is constructed of a tough, flexible plastic such as Mylar ® polyester film. The opposite sides 40 of the front sheet are wrapped somewhat more than 180° about a pair of vertical mounting rods 42. Each mounting rod is held in a hole presented by a pair of grooves 44, 46 formed respectively in inner and outer bars 48, 50 of the mounting frame 28. The extreme sides of the sheet 36 are wrapped about thin retaining rods 52 which more securely hold the side of the sheet about the mounting rods 42. An elongated vertical pressing bar 54 extends behind the middle of the backing plate, halfway between the opposite sides of the front sheet. When the pressing bar 54 is moved forwardly, in the direction of arrow F, it bends the backing plate 38. Since the opposite sides 40 of the front sheet 36 are prevented from moving forwardly, the backing plate, intensifier screens, film and front sheet are all pushed into a gentle curve (FIG. 7b), with the intensifier screens 32, 34 and film 16 between them pressed into intimate contact at all areas of the film. The intensifier screens then can aid in achieving uniformly full exposure of the film. Of course, it would be possible to fix the position of the pressing bar 54 and instead move back the opposite sides of the front sheet.

The pressing or pusher bar 54 is attached to a forward channel member 56. As shown in FIG. 5, the channel member 56 carries a pair of rollers 58, 60 which bear against a rearward channel member 62. The rearward channel member 62 has a pair of inclined slots 64, 66 at its upper and lower ends which receive a pair of cam members 68, 70 fixed to the mounting frame. In addition, a chain 72 is provided to pull down the rearward channel member 62 against the bias of springs 73 (FIGS. 2 and 3). Springs 73 extend between the fixed rod that mounts cams 68 and a rod 75 that extends through the flanges of channel 62. When the channel member 62 is pulled down, the cams 68, 70 force the rearward channel member to move forward, to push the rollers 58, 60 forward, and therefore to move the forward channel member 56 and pusher bar 54 forwardly.

FIG. 2 shows that the chain 72 that pulls down the rearward channel member 62 extends around a rotatable pulley 74 and up to a tensioning pulley 76. The tensioning pulley 76 is fixed to an operating shaft 78 to which the handle 26 is fixed. Thus, when the handle 26 is moved downwardly, the chain 72 is pulled to cause the film and the intensifier sheets to be bowed outwardly and into intimate contact.

FIG. 6 shows the three positions 28a, 28b, 28c of the mounting frame. At 28a, the top of the mounting frame is tilted back to receive the film 16. At position 28b, the mounting frame is vertical and the intensifier screens are held tightly against the film in preparation for exposure of the film. At 28c, the mounting frame is vertical, but the film is loosely disposed between the intensifier screens so that the film 16 can drop down between a pair of rollers 80 in film receiver 20.

FIG. 3 shows a cam 82 which is fixed to the operating shaft 78 and which controls backward pivoting of the mounting frame 28. When the handle 26 is turned to position 26u, shaft 78 rotates and the cam 82 assumes position 82a; then, the mounting frame 28 can pivot back about an axis 84 to the position 28a. At that position, the space between the intensifier screens is aligned with a guideway 86 through which a sheet of film is dispensed. Springs 88 bias the top of the mounting frame rearwardly to assure such tipping. When the shaft 78 is turned so that the cam is at position 82, the cam forces the mounting frame upright. However, even at the cam position 82, the shaft 78 is not turned far enough for the chain 72 to be pulled tight. When the shaft 78 is turned so the cam is at position 82b, the cam still holds the mounting frame upright, but the tensioning wheel 76 on the shaft is then rotated far enough to pull the chain 72 tightly enough to pull down the rearward channel member 62 so as to cause its forward movement that holds the film in intimate contact with the intensifier screens. After exposure of a film, the handle 26 and cam 82 are moved to their middle position and, as shown in FIG. 7c, a pair of film-holding pins 83 are moved back to allow the film 16 to drop into the exposed film receiver 20 (FIG. 1).

Pins 83 extend laterally from arms 87 that are pivoted on a shaft 89. Arms 87 have tabs that engage stops on catches 90 that are pivoted on a shaft 91. As channels 56, 62 are moved rearwardly, after an exposure, catches 90 pivot arms 87 sufficiently to move pins 83 out from beneath the exposed film 16 (FIG. 7c). After the exposed film has dropped to receiver 20, the operating handle can be moved to position 26u. With the mounting frame in position 28a, another film can be dispensed through guideway 86. As the frame moves to position 28a, the ends of catches 90 engage shaft 78 and the catches are pivoted sufficiently to move the stops away from the tabs on arms 87. When freed in this manner, arms 87 swing forwardly in response to the action of springs 92 and pins 83 move into their film-supporting position (FIG. 7a). When a film has been dispensed, the operating handle is moved to position 26d. As the handle moves, the channels 56, 62 move forward, and the screens move together (FIG. 7b). During these movements, the stops on catches 90 fall in behind the tabs on arms 87. With the handle in position 26d, the intensifier screens 32, 34, with the film 16 therebetween, can lie at least about three inches forward of the dispenser 18, or at least the bottom portion thereof, where the head of a patient would be positioned during the taking of a chest X-ray.

Following an exposure, handle 26 is moved to its central position. Rearward movement of channels 56, 62, responsive to the action of springs 73, also moves catches 90, arms 87 and pins 83 rearwardly. As noted previously, withdrawal of the pins 83 (FIG. 7c) releases the exposed film to receiver 20.

Figure 8:
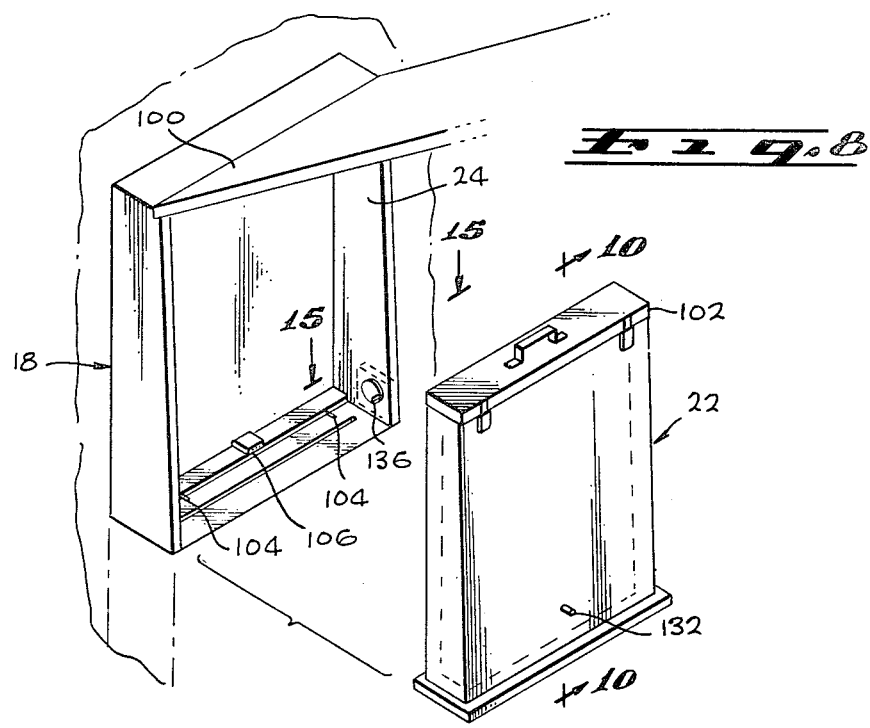
FIG. 8 is an exploded perspective view of the dispenser portion of the unit of FIG. 1, showing a film magazine outside of the receiver.
Figure 13:
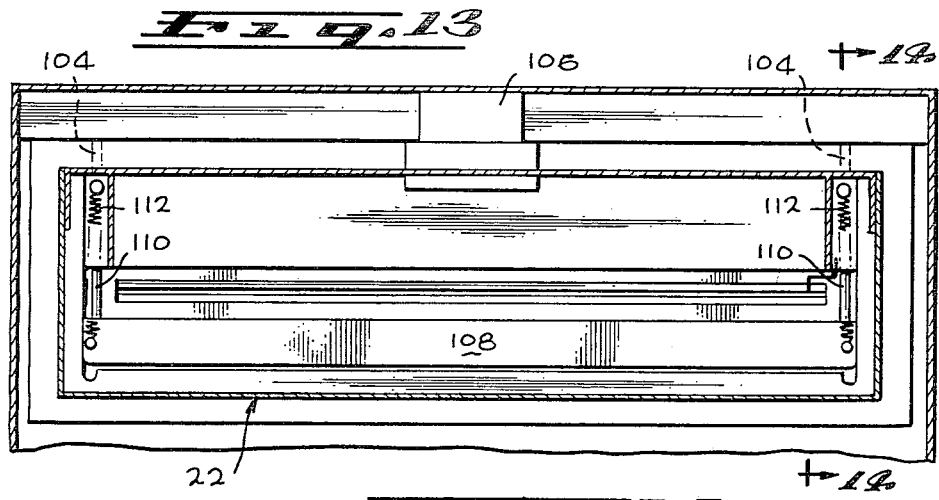
FIG. 13 is a view taken on the line 13—13 of FIG. 10.
Figure 14:
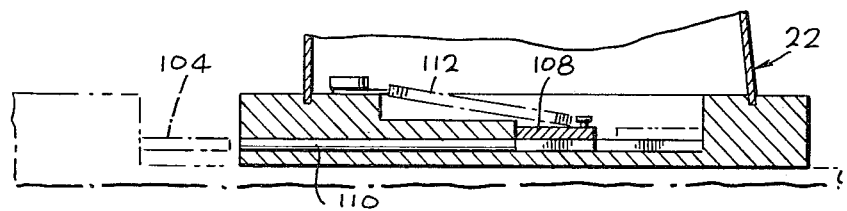
FIG. 14 is a view taken on the line 14—14 of FIG. 13.

FIGS. 8–16 illustrate details of the film dispenser 18 which dispenses one film at a time into the exposure apparatus. As shown in FIG. 8, the holding portion 24 of the dispenser has a cover 100 that can be swung open to receive the film-holding magazine 22. The film magazine 22 has a lid 102 at the top that can be opened to receive a stack of film sheets in a darkroom and which then can be closed to make the magazine lighttight. As the magazine 22 is installed in the holding portion 24, it encounters a pair of pins 104 that open a light seal at the bottom and a receptacle 106 that receives a mating plug on the magazine. FIG. 10 illustrates the light seal 108 at the bottom of the magazine 22, and shows the pair of rods 110 that are attached to the light seal. FIG. 12 illustrates the magazine 22 installed in the holder portion 24 of the dispenser, showing how the pins 104 on the holder depress the rods 110 to slide the light seal 108 against biasing of springs 112 so that a film sheet 16 can pass down through the dispenser.

As illustrated in FIG. 10, the magazine 22 includes a vertical pusher plate 114 whose upper end carries a pair of guides 116 that can move forwardly along downwardly inclined guideways 118 in a pair of guide plates 120. The pusher plate 114 is therefore urged by gravity to move forward, to push a stack of film 16S forwardly and down along an inclined support plate 122. As the film moves forward and down the support plate 122, the frontmost film is caught between a dispenser roller 124 and blocks 126 at the bottom of the pusher plate. The blocks 126, which are especially useful for pushing the last films of the stack into the roller, are constructed of low friction material such as a Delrin ® acetal resin.

The low friction material of the blocks 126 aids them in sliding down along a lower support plate 127 and in assuring that when the blocks push the last film against the drive roller 124 the blocks do not retard the film from moving down.

The forward edge 122e of the upper support plate 122 is accurately spaced from the drive roller 124 to form a throat 129 between them that permits only one sheet to pass down through the throat. Thus, for film sheets of ten mils (thousandth of an inch or 0.0254 mm) thickness, the edge 122e may be spaced a distance such as twelve mils (0.0305 mm) from the roller. Also the edge 122e may be formed of a low friction material such as a Teflon ® fluorocarbon resin to facilitate the passage of film thereby.

The magazine is normally loaded with film in a darkroom by laying the holder horizontally and then laying a stack of film on the pusher plate 114. When the holder is turned to the vertical as shown in FIG. 10, or is moved around, it is possible for more than one sheet to be pushed into the space above the support plate edge 122e and the drive roller 124. In order to avoid jamming of film, a backup member 128 is provided which can push the stack of film rearwardly, to push back sheets which have started to gather in and above throat space 129 and the roller. The backup member 128 is pivotally mounted at 130 and has a button 132 protruding from the film holder housing to enable a technician to press the button after he has loaded the magazine 22 in holding portion 24. The backup member is also useful in that when its end 128e pushes back the stack and quickly releases it, the member bends the sheets and "shakes up" the stack. Any film sheets which have not fallen down firmly onto the support plate 122 will do so, and the film sheets will lie in a more uniform arrangement for reliable dispensing.

When the film magazine 22 has been installed in the holding portion 24 of dispenser 18, a drive pin 134 (FIG. 15) at the end of the drive roller 124 lies in the path of a drive tab 136 which lies on a motor driven wheel. When a proper button on the control panel 30 of the unit is depressed, the drive roller 124 is rotated, as indicated in FIG. 10, to move down one film sheet past a microswitch 138, the thin arm of the microswitch deflecting out of the way of the film. The film then passes through a guideway 140 and through the guideway 86 into the exposure apparatus 14. Microswitch 138 is connected to a power source and to control panel 30 through receptacle 106.

The combination of the support plate edge 122e which is accurately spaced from the roller 124, the pusher plate 114 which holds the film upright and gently pushes it against the roller, and the backup member 128 which can push back and slightly bend the stack to help avoid sticking of the sheets to one another, all combine to assure regularity and evenness in the stack and therefore reliable feeding of only one sheet at a time past the roller. If a sheet is not fed, which is sensed by lack of operation of the microswitch 138, the technician can back up and slightly bend the stack once or twice, and again operate the roller to dispense a film sheet. Thus, by assuring that the sheets are well positioned in the magazine, uniform dispensing of the sheets is achieved.

Accordingly, the invention provides an X-ray unit which enables the daylight loading of one sheet at a time into an exposure station and the tight holding of that film sheet to intensifier screens at the exposure station, all with a relatively simple and low cost apparatus. The close holding of the film sheet to the intensifier screens is accomplished by the use of a flexible plastic sheet, whose opposite sides are securely held, a resilient backing plate, and a pressing bar that pushes along the center line of the resilient backing plate to deform it forwardly. The mounting frame that holds the flexible front sheet, backing plate, and pressing bar is pivotally mounted to enable its top to pivot back to receive a new sheet of film from a dispenser located far enough behind the exposure station to avoid interference with the taking of chest X-rays. The combination of a pusher plate and backup member which assure a uniformly held stack of films sheets, allows for reliable dispensing of one sheet at a time.

I claim:

1. An X-ray unit comprising:
   an upright mounting frame;
   a flexible resilient front sheet having opposite sides held to said frame, said flexible, resilient front sheet being formed of a thin polyester material;
   a flexibly resilient backing plate lying behind and normally spaced from said flexible sheet;
   an intensifier screen attachable to said backing plate to lie facewise against a sheet of film;
   pressing means including an upright bar disposed along the middle portion of said backing plate which lies between said opposite sides of said front sheet for applying bending force to said plate; and
   means for moving said bar to move said backing plate into engagement with said sheet, the engagement of said backing plate with said film sheet being adapted to bend and tension said backing plate, said screen, the film sheet and said front sheet to hold them in intimate contact.

2. An X-ray unit comprising:
   an upright mounting frame;
   a flexible front sheet having opposite sides held to said frame;
   a flexibly resilient backing plate lying behind and normally spaced from said flexible sheet;
   at least one intensifier screen positioned between said front sheet and said backing plate to lie facewise against a sheet of film;
   pressing means including an upright bar disposed along the middle portion of said backing plate and lying between said opposite sides of said front sheet for applying bending force to said plate, said pressing means including a member which is attached to said bar, extends largely vertically and carries rollers at its upper and lower end portions; and
   means for moving said bar to move said backing plate into engagement with said sheet, said moving means including a second vertical member bearing against said rollers and supported on said mounting frame to move at a downward forward incline while pressing on said rollers, spring means connected to said vertical member for biasing it upwardly, and means connected to said second vertical member for pulling it down and forward against said rollers and the bias of said spring members, the engagement of said backing plate with said sheet being adapted to bend and tension said backing plate, film and screen to hold them in intimate contact.

3. The unit described in claim 2 including:
   a main frame;

a film dispenser mounted on said main frame over said mounting frame, said dispenser having a housing for holding a plurality of film sheets and having a mechanism for dispensing a film sheet downwardly through an opening near the bottom of said dispenser; and wherein said mounting frame is pivotally mounted on said main frame about a tipping axis passing through the lower half of said mounting frame, to permit the upper end of said mounting frame to tip back from an upright position to a receiving position wherein the space between said backing plate and front sheet is aligned with said opening to receive a film therefrom;

second spring means for urging said mounting frame to tip back to said receiving position;

a shaft pivotally mounted on said main frame and carrying a cam at a level above said tipping axis, said cam movable to force said mounting frame to said upright position or to allow said mounting frame to tip back, when said shaft is respectively turned to a first orientation or a second orientation; and said pulling means is coupled to said shaft and taut when said shaft is turned to said first orientation to move said mounting frame upright and the tension in said pulling means is released when said shaft is turned to said second orientation to tip said mounting frame back, whereby to automatically allow separation of said backing plate and front sheet when they are tipped back to receive a film sheet.

4. The unit described in claim 2 wherein:

said mounting frame includes walls forming two holes, each hole extending vertically along opposite sides of said front sheet, a slot leading to each hole, and a rod extending along each hole; and each side of said front sheet extends through one of said slots and is wrapped about a corresponding rod that lies in a corresponding hole, said sheet being a plastic film.

5. A chest X-ray unit comprising:

an exposure station which includes a forward portion in front of which a patient can be positioned, and a pair of intensifier screens for holding an X-ray film sheet therebetween; and a dispenser lying over said exposure station, said dispenser including a lighttight housing holding a stack of film sheets and having an opening through which a film sheet can be dispensed, said dispenser also including means for dispensing one film sheet at a time through said opening;

said exposure station including a mechanism for holding said screens tightly against a film sheet, at a position forward of the dispenser housing portion which lies immediately above said exposure station, to provide clearance for the head of a patient whose chest X-ray is being taken, said mechanism being operable to separate the screens and to pivot them about an axis lower than the middle of said screens to move the upper ends of the screens rearwardly to a position in line with said opening to receive a film sheet between the screens, there being at least one retractable member beneath said screens to support a film sheet, said member being coupled to the mechanism for retraction as said screens are separated, said mechanism including:

a mounting frame, a flexible sheet lying in front of said intensifier screens and having opposite sides mounted on said mounting frame, a backing plate lying behind said screens, and pressing means coupled to said frame and movable against the rear of said backing plate to push it closer to said flexible sheet and further including:

a main frame, said mounting frame being pivotally mounted on the main frame about an axis extending through the lower half of the mounting frame to enable the upper end of said mounting frame to pivot rearwardly until the space between said screens lies under said opening; and means for pivoting said mounting frame on said main frame.

* * * * *